(12) United States Patent
Lai et al.

(10) Patent No.: US 9,745,038 B2
(45) Date of Patent: Aug. 29, 2017

(54) DC POWER SYSTEM FOR MARINE APPLICATIONS

(71) Applicant: GENERAL ELECTRIC COMPANY, Schenectady, NY (US)

(72) Inventors: Rixin Lai, Clifton Park, NY (US); Di Zhang, Niskayuna, NY (US); Dong Dong, Schenectady, NY (US); Konrad Roman Weeber, Rexford, NY (US); Ravisekhar Nadimpalli Raju, Clifton Park, NY (US); Steven Michael Mankevich, Pittsburgh, PA (US)

(73) Assignee: General Electric Company, Niskayuna, NY (US)

( * ) Notice: Subject to any disclaimer, the term of this patent is extended or adjusted under 35 U.S.C. 154(b) by 462 days.

(21) Appl. No.: 14/328,856

(22) Filed: Jul. 11, 2014

(65) Prior Publication Data

US 2016/0009354 A1    Jan. 14, 2016

(51) Int. Cl.
| | |
|---|---|
| H02J 3/00 | (2006.01) |
| H02J 7/34 | (2006.01) |
| H02G 3/00 | (2006.01) |
| B63J 3/00 | (2006.01) |
| B60L 3/00 | (2006.01) |
| H02J 1/10 | (2006.01) |
| H02J 1/00 | (2006.01) |

(52) U.S. Cl.
CPC ............... *B63J 3/00* (2013.01); *B60L 3/0092* (2013.01); *H02G 3/00* (2013.01); *H02J 1/102* (2013.01); *H02J 7/34* (2013.01); *B63J 2003/002* (2013.01); *H02J 2001/008* (2013.01)

(58) Field of Classification Search
CPC . B63J 3/00; B63J 2003/02; H02G 3/00; H02J 1/00; H02J 2001/008; H02J 7/34; H02J 1/102; B60L 3/0092
USPC .......................................................... 307/9.1
See application file for complete search history.

(56) References Cited

U.S. PATENT DOCUMENTS

| | | | |
|---|---|---|---|
| 6,177,738 B1 | 1/2001 | Hentunen et al. |
| 6,188,591 B1 | 2/2001 | Ruter et al. |
| 7,544,108 B2 | 6/2009 | Rzadki et al. |

(Continued)

FOREIGN PATENT DOCUMENTS

| | | |
|---|---|---|
| EP | 0536876 A1 | 4/1993 |
| EP | 1422803 A1 | 5/2004 |

(Continued)

OTHER PUBLICATIONS

Thomas et al., "Fault location for DC marine power systems", Electric Ship Technologies Symposium, 2009. IEEE, pp. 456-460, Apr. 2009.

(Continued)

*Primary Examiner* — Hal Kaplan
(74) *Attorney, Agent, or Firm* — Nitin N. Joshi

(57) ABSTRACT

A power system for a marine ship includes a plurality of protection zones, wherein at least two protection zones are coupled to each other via at least one bus-tie converter. Each of the protection zones includes a plurality of direct current (DC) buses; wherein DC buses which do not have same DC voltage are coupled to each other via at least one DC to DC converter. Furthermore, at least one energy source is coupled to at least one DC bus via a power electronic converter.

21 Claims, 3 Drawing Sheets

(56) References Cited

U.S. PATENT DOCUMENTS

| | | |
|---|---|---|
| 7,948,207 B2 | 5/2011 | Scheucher |
| 8,049,358 B2 | 11/2011 | Crane et al. |
| 8,115,334 B2 | 2/2012 | Vyas et al. |
| 8,244,419 B2 | 8/2012 | Wegner-Donnelly et al. |
| 8,525,492 B2 | 9/2013 | Peterson et al. |
| 8,970,176 B2 * | 3/2015 | Ballatine ............... H02J 1/102 307/11 |
| 2002/0014802 A1 | 2/2002 | Cratty |
| 2004/0102109 A1 | 5/2004 | Cratty et al. |
| 2013/0271083 A1 | 10/2013 | Williams |
| 2014/0012446 A1 | 1/2014 | Kumar et al. |

FOREIGN PATENT DOCUMENTS

| | | |
|---|---|---|
| EP | 2077226 A2 | 7/2009 |
| WO | 2013010577 A1 | 1/2013 |

OTHER PUBLICATIONS

"ABB launches innovative power system for marine applications", ABB, Apr. 23, 2011.

European Search Report and Written Opinion issued in connection with EP Application No. 15176222,6 dated Jul. 5, 2016.

* cited by examiner

DC POWER SYSTEM FOR MARINE APPLICATIONS

BACKGROUND

Embodiments of the invention relate generally to a direct current (DC) power system and more specifically to a DC power system for marine applications.

In the last few decades, marine traffic has increased substantially across the world due to tremendous rise in cargo transport vessels, warships, offshore oil ships, passenger ships etc. These vessels or ships have many electrical loads on board. Variable speed electric drives for pumps, fans, electric propulsion installations, lighting and air conditioning are some examples of the electrical loads on board of a ship. The electrical loads operate at various different voltages and frequencies, and thus need separate electric power supplies.

Most of the ships use alternating current (AC) power system architecture. However, more recently some ships are using DC power system architecture including energy storage devices or electrical generators to meet the demands of the plurality of electrical loads. If a load needs alternating current (AC) power supply, the DC power may be converted into AC power with help of power electronic converters. Similarly, if the electrical generator is AC then the AC power may be converted into DC power via power electronic converters. Generally, a plurality of generators supply power to a plurality of DC buses which in turn supply power to a particular electrical load. There are examples where a single DC bus can also provide power to the entire ship electrical load.

Challenges with conventional DC power system include integration of multiple DC buses with different voltage levels, isolating the faults in the DC power system in a very short time and integrating the various energy storage devices and generators. For these and other reasons, there is a need for the present DC power system for marine applications.

BRIEF DESCRIPTION

In accordance with an embodiment of the present technique, a power system for a marine ship is provided. The power system includes a plurality of protection zones wherein each protection zone comprising a plurality of direct current (DC) buses. The DC buses which do not have same DC voltage are coupled to each other via at least one DC to DC converter and at least one energy source is coupled to at least one DC bus via a power electronic converter. Furthermore, at least two protection zones are coupled to each other via at least one bus-tie converter.

In accordance with another embodiment of the present technique, a method of providing power to a marine ship is provided. The method includes providing power to at least one DC bus in the marine ship via an energy source connected to a power electronic converter and connecting at least two protection zones of the marine ship via at least one bus-tie converter. The method also includes coupling DC buses which do not have same DC voltage in one protection zone with each other via at least one DC to DC converter.

DRAWINGS

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Figure 1:
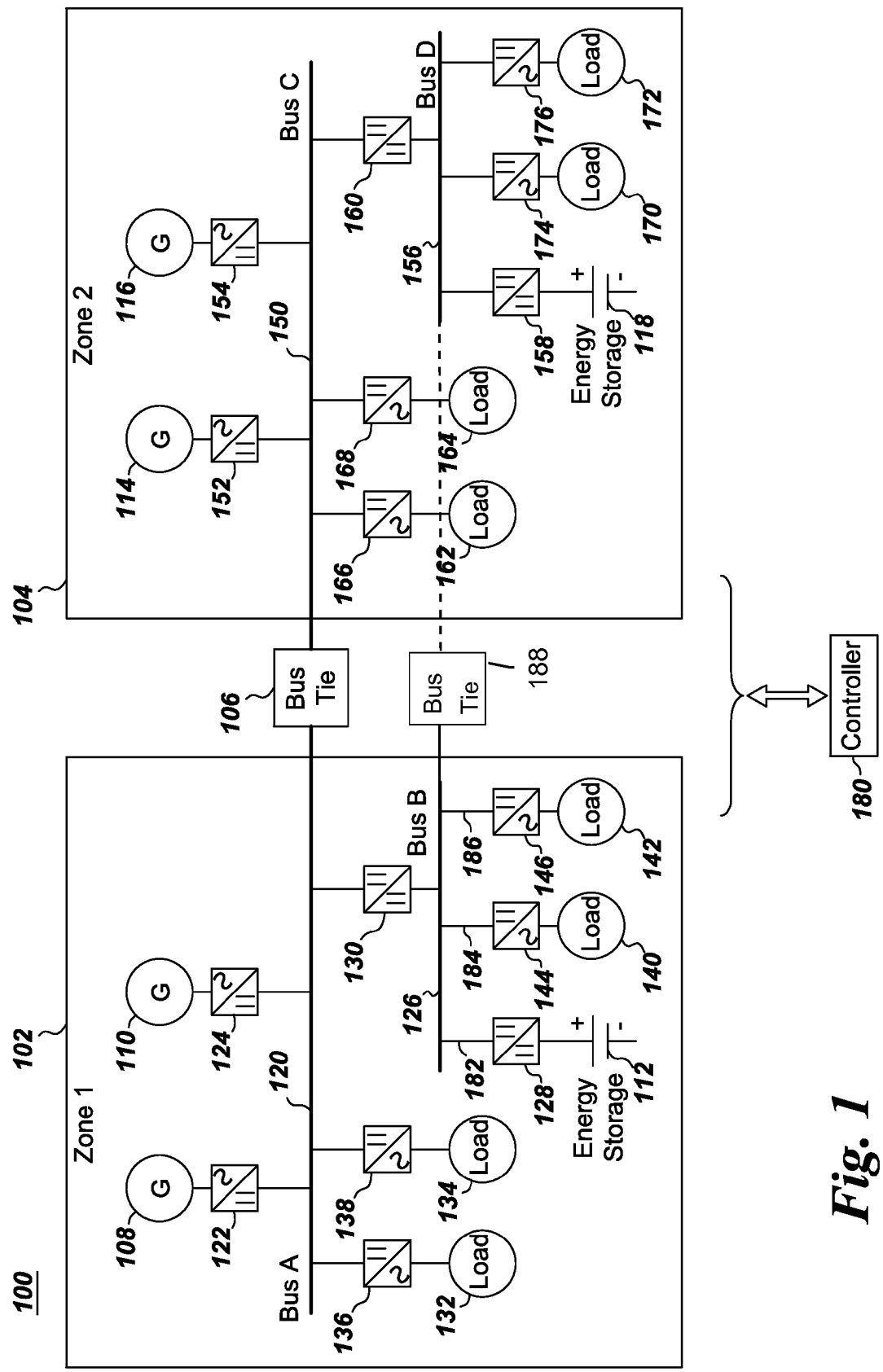
FIG. 1 is a diagrammatical representation of a power system for a marine ship, according to aspects of the present disclosure.

Turning now to the drawings, by way of example in FIG. 1, a power system 100 for a marine ship is depicted. In one embodiment, the power system 100 may include two protection zones 102 and 104 coupled via bus-tie converters 106 and 188. However, in other embodiments, there may be many such protection zones which are connected to each other via a plurality of bus-tie converters. As will be appreciated by those skilled in the art, protection zones are created to limit the extent to which a power system may be disconnected during a fault. The protection zone in the Marine ship may include energy sources, DC buses and a plurality of converters to feed power to various loads. The energy sources may be AC or DC generators, energy storage devices and the loads may include lighting loads or variable frequency drives, for example. In the embodiment shown, protection zone 102 includes energy sources such as AC generators 108, 110 and an energy storage device 112 and protection zone 104 includes energy sources such as AC generators 114, 116 and an energy storage device 118.

Furthermore, in protection zone 102, AC generators 108, 110 feed power to a DC bus 120 via power electronic converters 122 and 124 respectively, and energy storage device 112 feeds power to a DC bus 126 via a power electronic converter 128. Power electronic converters 122, 124 are AC to DC converters as they have to convert power from AC generators to the DC bus whereas power electronic converter 128 is a DC to DC converter as it couples a DC energy storages device to a DC bus. The two DC buses 120 and 126 do not have same DC voltage and hence are coupled to each other via a DC to DC converter 130. DC to DC converter 130 may be a bidirectional DC to DC converter or an unidirectional DC to DC converter. Further, loads 132 and 134 are connected to DC bus 120 via power electronic converters 136 and 138 respectively and loads 140 and 142 are connected to DC bus 126 via power electronic converters 144 and 146 respectively. Depending on whether the load is an AC load or a DC load, power electronic converter 136, 138, 144 and 146 may be DC to AC converters or DC to DC converters.

In similar manner, in protection zone 104, AC generators 114, 116 feed power to a DC bus 150 via power electronic converters 152 and 154 respectively, and energy storage device 118 feeds power to a DC bus 156 via a power electronic converter 158. The two DC buses 150 and 156 are coupled to each other via a DC to DC converter 160. Furthermore, loads 162 and 164 are connected to DC bus 150 via power electronic converters 166 and 168 respectively and loads 170 and 172 are connected to DC bus 152 via power electronic converters 174 and 176 respectively. Based on the type of load i.e., an AC load or a DC load, power electronic converter 166, 168, 174 and 176 may be DC to AC converters or DC to DC converters. It should be noted that in the embodiment shown, all converters have been shown to have only one input terminal and one output terminal for ease of explanation. However, a negative terminal or a reference terminal is always there at the input and the output of each of the converter.

Power System 100 further includes a controller 180 to control the operation of bus-tie converters 106, 188 and other converters in protection zones 102 and 104. It should be noted that even though a single controller 180 is shown in the embodiment of FIG. 1, in other embodiments controller 180 may be split into a plurality of controllers and each individual controller may control a part of the power system 100. Power system 100 may also include passive devices such as fuses and/or circuit breakers (not shown) to protect the power system 100 during a fault (e.g., short circuit fault). In one embodiment, controller 180 blocks propagation of a fault from one DC bus to another DC bus based on the coordination between the bus-tie converter, the passive devices and other power electronic and/or DC to DC converters.

For example, if there is a fault on DC bus 126 or the subsequent branches connected to it (e.g., branches 182, 184, 186 in FIG. 1), then controller 180 would block propagation of that fault (i.e., one fault creating another fault) from DC bus 126 to DC bus 120. It should be noted that the fault may be detected by controller 180 if an output current of converter 130 exceeds a fault current magnitude threshold or if an output voltage of converter 130 breaches a fault voltage magnitude threshold. During the fault on DC bus 126, controller 180 would operate DC to DC converter 130 which is feeding power to DC bus 126 in a current control mode and thus limits a fault current supplied by DC bus 120 to DC bus 126. Once the fault is cleared by passive devices (e.g., fuse or breaker) with the help of controller 180 or otherwise, controller 180 will charge DC bus 126 to a rated level. Once DC bus 126 is charged to the rated level, controller 180 will switch back operation of DC to DC converter 130 to a normal mode. In one embodiment, the normal mode of DC to DC converter 130 refers to a voltage control mode. However, if the fault sustains for a certain amount of time, which indicates a permanent fault on the bus and not a transient one, controller 180 will stop the operation of DC/DC converter 130 and notify the upstream system. Controller 180 would similarly control other converters so as to block propagation of the fault from one bus to another bus.

In one embodiment of the present technique, a second bus-tie converter 188 may be used to connect low voltage buses 126 and 156. In other words, protection zones 102 and 104 may be coupled to each other via two bus-tie converters 106 and 188. Bus-tie converter 106 couples medium voltage buses 120 and 150 and bus-tie converter 188 couples low voltage buses 126 and 156. It should be noted that low voltage buses 126 and 156 operate at a low voltage with respect to medium voltage buses 120 and 150 respectively. This embodiment allows low voltage buses 126 and 156 and their corresponding branches to operate normally even if one of the medium voltage buses 120 or 150 is faulty and unable to supply any power.

Figure 2:
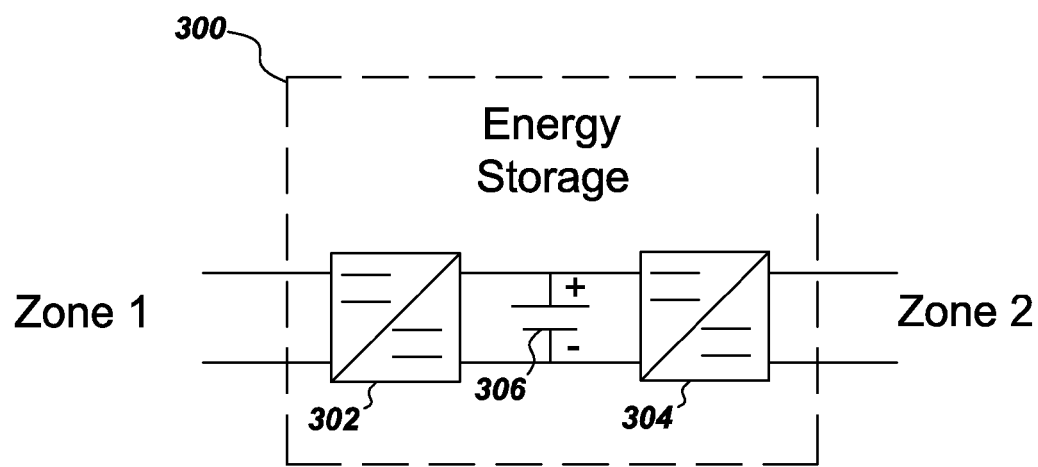
FIG. 2 is a diagrammatical representation of a detailed view of a bus-tie converter of FIG. 1, according to aspects of the present disclosure.

FIG. 2 shows a detailed view of a bus-tie converter 300 such as bus-tie converters 106 and 188 of FIG. 1 in accordance with an embodiment of the present technique. Bus-tie converter 300 includes a first DC to DC converter 302, a second DC to DC converter 304 and an energy storage device 306. Energy storage device 306 may be a capacitor or a battery, for example. First DC to DC converter 302 is connected to a zone 1 and second DC to DC converter 304 is connected to a zone 2. In one embodiment, zone 1 and zone 2 can exchange power among each other, i.e., zone 1 can supply power to zone 2 or zone 2 can supply power to zone 1. In such an embodiment, first DC to DC converter 302 and second DC to DC converter 304 both will be bidirectional DC to DC converters. Examples of bidirectional DC to DC converters include full bridge IGBT converters.

In another embodiment, the power flow between two zones, zone 1 and zone 2 may need to be only unidirectional i.e., either from zone 1 to zone 2 or from zone 2 to zone 1. In such an embodiment, first DC to DC converter 302 and second DC to DC converter 304 both can be unidirectional DC to DC converters. Examples of unidirectional DC to DC converters include half bridge IGBT/diode converters, i.e., asymmetrical H bridge with a diode and an IGBT in each leg, or diode bridge converters.

In operation a controller (e.g., controller 180 of FIG. 1) operates one converter, first DC to DC converter 302 or second DC to DC converter 304 in a voltage control mode, i.e., the one converter keeps the voltage constant. The other converter will be operated in a current control mode by the controller to achieve the required power flow between the two zones. However, when there is fault in one of the zones then the controller blocks the power transfer from a non-faulty zone to a faulty zone.

For example, if the controller finds a fault in zone 1 or its branches, the controller will stop the operation of first converter 302 and thus, stops the energy flow between zone 1 and zone 2. During this state, the controller 180 would enable second converter 304 to either charge energy storage device 306 or supply power to the loads. In other words, even though there is a fault in zone 1, zone 2 would continue to operate normally. The controller would further operate one or more converters in zone 1 in current control mode. If the fault is transient then once the fault is cleared, the controller 180 will resume the operation of first converter 302 and thus, the system will resume normal operation. However, if the fault is not cleared within a certain time i.e., if it is a permanent fault then converter 302 will be disabled and a mechanical switch between zone 1 and zone 2 will be open.

In an embodiment, where there are two bus-tie converters (e.g., 106, 188 of FIG. 1), when the controller finds a fault in zone 1 at a particular location (e.g., medium voltage bus), the controller will stop the operation of only corresponding bus-tie converter (i.e., medium voltage bus-tie converter) as discussed in preceding paragraph. Other bus-tie converter (i.e., low voltage bus-tie converter) would still supply power to zone 1 via energy storage 306. Furthermore, in the implementation of the bus tie converter 106 and 188 (FIG. 1), the type of energy storage element 306 can be tailored to the duty and load cycles of the corresponding buses that the bus tie connects. Energy storage element 306 can be an appropriate power batteries (such as ultra capacitors, capacitors, lithium ion batteries) or energy batteries (such as lithium ion batteries, lead-acid, or sodium metal halide batteries).

Figure 3:
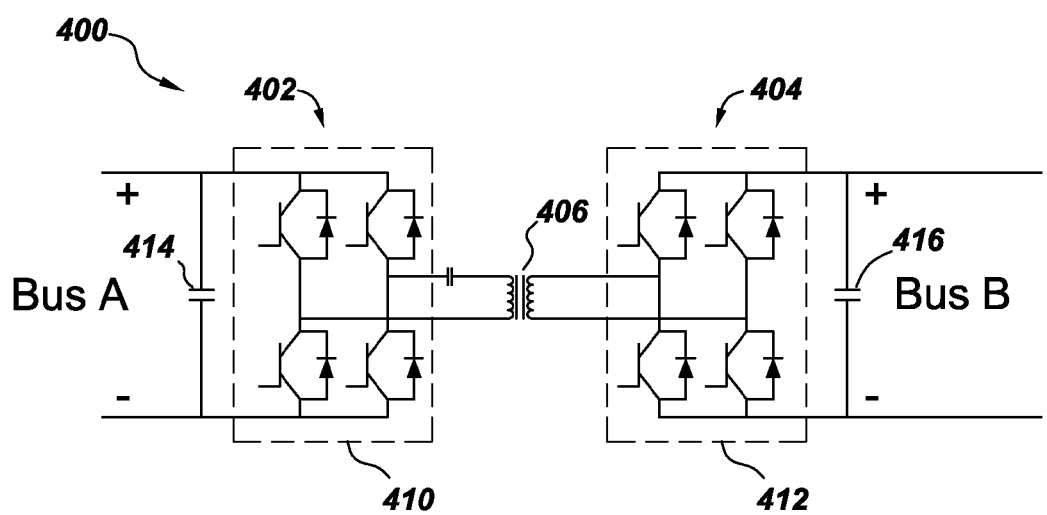
FIG. 3 is a detailed view of a DC to DC converter of FIG. 1 or FIG. 2, according to aspects of the present disclosure.

FIG. 3 shows a detailed view of a DC to DC converter 400 such as DC to DC converters 130 and 160 of FIG. 1 or DC to DC converters 302 and 304 of FIG. 2, in accordance with an embodiment of the present technique. DC to DC converter 400 may be a medium frequency (e.g., 500 Hz to 2 kHz) converter or a high frequency (e.g., 2 kHz to 100 kHz) converter. In the embodiment shown, DC to DC converter 400 is connected between a bus A and a bus B and includes a DC to AC conversion stage followed by an AC to DC conversion stage. DC to DC converter 400 is a bidirectional converter, i.e., DC to DC converter 400 allows power transfer from bus A to bus B and vice versa. Specifically, DC to DC converter 400 includes a bus A converter 402 and a bus B converter 404. Bus A converter 402 and bus B converter 404 are coupled to each other via a high or medium frequency transformer 406. Bus A converter 402 and bus B converter 404 both include full bridge IGBT converters 410, 412 and capacitors 414, 416 on one of their sides as shown.

In operation, if the power needs to be transferred from bus A to bus B then bus A converter 402 will act as a DC to AC converter and bus B converter 404 will act as an AC to DC converter. In this case, bus A converter 402 converts input DC voltage into medium/high frequency AC voltage and bus B converter 404 converts medium/high frequency AC voltage into DC voltage. Similarly, if the power needs to be transferred from bus B to bus A then bus B converter 404 will act as a DC to AC converter and bus A converter 402 will act as an AC to DC converter. Transformer 406 provides a coupling between AC connections of bus A converter 402 and AC connections of bus B converter 404. As discussed earlier if power is being supplied to bus B from bus A and if there is a fault on bus B then converter 400 will operate in current control mode. Furthermore, if power transfer needs to be unidirectional, i.e., only from bus A to bus B or vice versa then the full bridge IGBT converters 410, 412 may be replaced with full bridge diode converters.

Figure 4:
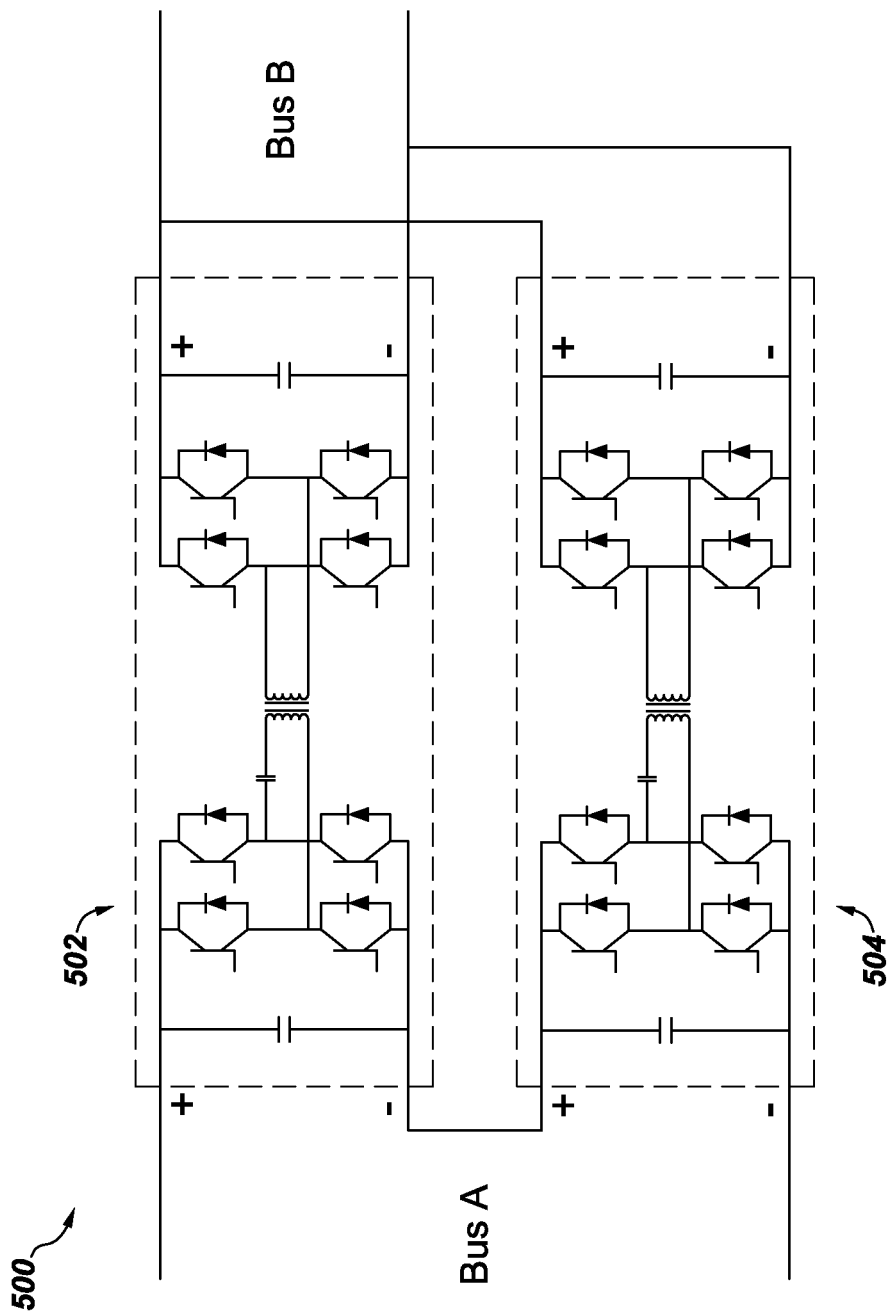
FIG. 4 is a detailed view of another embodiment of a DC to DC converter of FIG. 1 or FIG. 2, according to aspects of the present disclosure.

FIG. 4 shows a detailed view of another embodiment of a DC to DC converter 500 such as DC to DC converters 130 and 160 of FIG. 1 or DC to DC converters 302 and 304 of FIG. 2. In the embodiment shown, DC to DC converter 500 utilizes a plurality of DC to DC converters 502, 504 such as converter 400 of FIG. 3 which are connected in series on bus A side and in parallel on bus B side. The advantage of this embodiment is that it can provide higher voltage on bus A side and can provide higher current on bus B side. In alternative embodiments, converter 502, 504 can be connected in series or parallel on both sides as per the voltage, current or power requirements.

Advantages of the present technique include high power density, high efficiency and excellent fault handling capability because of use of high or medium frequency DC to DC converters. Furthermore, since the energy storage elements are integrated in a bus-tie converter, the power system at different zones can share the same energy storage. Another advantage of the present technique is that the bus tie converter can disconnect the two zones extremely fast during a fault scenario.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system for a marine ship, comprising:
a plurality of protection zones, each protection zone comprising:
a plurality of direct current (DC) buses; wherein DC buses which do not have same DC voltage are coupled to each other via at least one DC to DC converter;
at least one energy source coupled to at least one DC bus via a power electronic converter; and
wherein at least two protection zones are coupled to each other via at least one bus-tie converter.

2. The power system of claim 1 further comprising a controller to control the operation of at least one DC to DC converter, the power electronic converter and the bus-tie converter.

3. The power system of claim 2, wherein the controller blocks propagation of a fault from one DC bus to another DC bus based on the coordination between the operation of the at least one DC to DC converter, the power electronic converter, and the bus-tie converter.

4. The power system of claim 2, wherein the controller blocks propagation of a fault from a faulty DC bus to a non-faulty DC bus by operating the DC to DC converter feeding a faulty DC bus in a current control mode.

5. The power system of claim 2, wherein the controller blocks power flow between a faulty protection zone and a non-fault protection zone by stopping operating of a part of the corresponding bus-tie converter.

6. The power system of claim 2, wherein the at least two protection zones are coupled to each other via a medium voltage bus-tie converter and a low voltage bus-tie converter, wherein the medium voltage bus-tie converter is connected between medium voltage buses of the at least two protection zones and the low voltage bus-tie converter is connected between low voltage buses of the at least two protection zones.

7. The power system of claim 6, wherein when there is a fault in one of the zones, the controller controls one of the medium voltage bus-tie converter or the low voltage bus-tie converter to provide power to a part of the faulty zone via an energy storage device of the corresponding bus-tie converter.

8. The power system of claim 6, wherein an energy storage device for either low voltage or medium voltage bus-tie converters includes a battery suitable for load profiles at the corresponding low voltage or medium voltage bus.

9. The power system of claim 1, wherein the at least one DC to DC converter comprises a high frequency DC to DC converter or a medium frequency DC to DC converter.

10. The power system of claim 9, wherein the bus-tie converter includes a first DC to DC converter coupled to a second DC to DC converter via an energy storage device.

11. The power system of claim 10, wherein when the bus-tie converter is a bidirectional power converter, and the first and the second DC to DC converters include full bridge converters.

12. The power system of claim 10, wherein when the bus-tie converter is a unidirectional power converter, and the first and the second DC to DC converters include half bridge converters or diode bridge converters.

13. The power system of claim 10, wherein the each of the first and the second DC to DC converters include a single DC to DC converter or a plurality of DC to DC converters connected in series or in parallel or any combination therein.

14. The power system of claim 1, wherein the at least one energy source includes a generator or an energy storage device.

15. The power system of claim 14, wherein when the at least one energy source includes the generator, the generator includes a DC generator or an alternating current (AC) generator.

16. The power system of claim 15, wherein when the generator is the AC generator, the power electronic converter includes an AC to DC converter and when the generator is the DC generator, the power electronic converter includes a DC to DC converter.

17. A method of providing power to a marine ship comprising:
providing power to at least one DC bus in the marine ship via an energy source connected to a power electronic converter;
connecting at least two protection zones of the marine ship via at least one bus-tie converter; and
coupling DC buses which do not have same DC voltage in one protection zone with each other via at least one DC to DC converter.

18. The method of claim 17 further comprising stopping operation of a part of the bus-tie converter to block power transfer between the at least two protection zones if a fault occurs in one of the protection zones.

19. The method of claim 17 further comprising operating the at least one DC to DC converter in a current control mode if a fault occurs on the DC bus that is being supplied by the at least one DC to DC converter.

20. The method of claim 19 further comprising turning off the at least one DC to DC converter if the fault is not cleared within a threshold time.

21. The method of claim 19 further comprising operating the at least one DC to DC converter in a normal mode if the fault is cleared within a threshold time.

* * * * *